United States Patent [19]

Fujikawa et al.

[11] 4,390,128

[45] Jun. 28, 1983

[54] HEAD LAMP WASHING SYSTEM

[75] Inventors: Tadashi Fujikawa, Tokyo; Masami Goto, Koganei, both of Japan

[73] Assignee: Nissan Motor Company, Limited, Yokohama, Japan

[21] Appl. No.: 302,749

[22] Filed: Sep. 16, 1981

Related U.S. Application Data

[63] Continuation of Ser. No. 97,384, Nov. 26, 1979, abandoned.

[30] Foreign Application Priority Data

Dec. 11, 1978 [JP]  Japan .................................. 53-153287

[51] Int. Cl.³ .............................................. B60S 1/56
[52] U.S. Cl. .............................................. 239/284 A
[58] Field of Search ......................... 239/284 R, 284 A

[56] References Cited

U.S. PATENT DOCUMENTS

| 3,593,015 | 7/1971 | Marchant | 239/284 A X |
| 3,915,385 | 10/1975 | Hassinger | |
| 4,177,928 | 12/1979 | Bergkvist | 239/284 R X |

FOREIGN PATENT DOCUMENTS

| 2628179 | 1/1978 | Fed. Rep. of Germany | 239/284 A |
| 2654228 | 6/1978 | Fed. Rep. of Germany | 239/284 A |
| 2125876 | 9/1972 | France | |
| 2157502 | 6/1973 | France | |
| 2205025 | 5/1974 | France | |
| 2379410 | 10/1978 | France | 239/284 R |
| 1383875 | 2/1975 | United Kingdom | 239/284 A |
| 1386000 | 3/1975 | United Kingdom | 239/284 A |
| 1414405 | 11/1975 | United Kingdom | 239/284 A |

Primary Examiner—Andres Kashnikow
Attorney, Agent, or Firm—Lane, Aitken & Kananen

[57] ABSTRACT

A head lamp washing system is disclosed which comprises a solenoid valve having an inlet and first and second outlets, the solenoid valve operable in its first position where the inlet is connected only to the first outlet when energized and in its second position where the inlet is connected only to the second outlet when deenergized, first and second injectors each having at least one injection nozzle, the injection nozzle of the first injector connected to the first inlet, the injection nozzle of the second injector connected to the second inlet, a detergent cistern containing a liquid detergent, the cistern connected to the inlet of the solenoid valve, a pressurizer for pressurizing the liquid detergent supplied to the solenoid valve, and a control circuit for alternatively allowing and cutting off power to the solenoid valve on a periodic basis.

3 Claims, 5 Drawing Figures

HEAD LAMP WASHING SYSTEM

This application is a continuation of application Ser. No. 97,384, filed Nov. 26, 1979 now abandoned.

BACKGROUND OF THE INVENTION

1. Field of the Invention

This invention relates to a head lamp washing system suitable particularly for washing head lamps having a wide area to be washed.

2. Description of the Prior Art

Head lamp washing systems have already been proposed which have nozzles for injection of liquid detergent against the soiled surfaces of right and left head lamps to wash them. In conventional head lamp washing systems, a plurality of nozzles have been used to wash a large-sized head lamp since the area against which each nozzle can inject liquid detergent is relatively small. However, this requires a higher power pump for injecting liquid detergent with sufficient flow and pressure to wash the head lamp. Additionally, liquid detergent injected from a plurality of nozzles partly overlaps with each other, which results in an appreciable detergent economy penalty.

SUMMARY OF THE INVENTION

It is therefore one object of the present invention to provide an improved head lamp washing system which will be free from the above mentioned disadvantages.

Another object of the present invention is to provide a head lamp washing system which permits the use of an increased number of detergent injection nozzles to provide a wide washing area without the need for any high power pump.

Still another object of the present invention is to provide a head lamp washing system which permits the use of an increased number of detergent injection nozzles to provide a wide washing area without formation of any detergent overlapping zone.

According to the present invention, these and other objects are accomplished by a head lamp washing system comprising a solenoid valve having an inlet and first and second outlets, the solenoid valve operable in its first position where the inlet is connected only to the first outlet when energized and in its second position where the inlet is connected only to the second outlet when deenergized, first and second injectors each having at least one injection nozzle, the injection nozzle of the first injector connected to the first inlet of the solenoid valve, the injection nozzle of the second injector connected to the second inlet thereof, a detergent cistern containing a liquid detergent, the cistern connected to the inlet of the solenoid valve, a pressurizer for pressurizing the liquid detergent supplied to the solenoid valve, and a control circuit for alternatively allowing and cutting off power to the solenoid valve on a periodic basis.

Other objects, means, and advantages of the present invention will become apparent to one skilled in the art thereof from the following description.

BRIEF DESCRIPTION OF THE DRAWINGS

The following explanation of several preferred embodiments of the present invention will help in the understanding thereof, when taken in conjunction with the accompanying drawings, which, however, should not be taken as limiting the present invention in any way, but which are given for purposes of illustration only. In the drawings, like parts are denoted by like reference numerals in the several figures, and.

DESCRIPTION OF THE PREFERRED EMBODIMENTS

Figure 1:
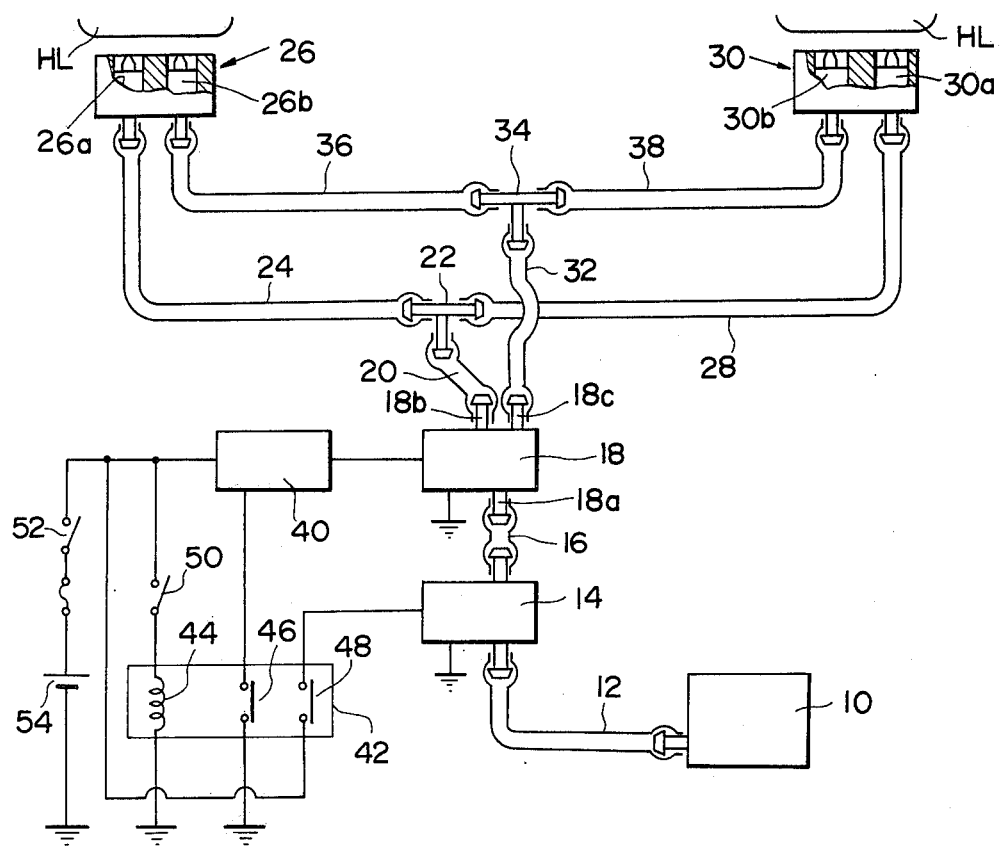
FIG. 1 is a schematic view showing one embodiment of the head lamp washing system of the present invention.

Referring now to FIG. 1, there is illustrated one embodiment of a head lamp washing system made in accordance with the present invention. The system comprises a detergent cistern 10 containing liquid detergent. The detergent cistern 10 is connected through a pipe 12 to a pump 14 which in turn is connected through a pipe 16 to the inlet 18a of a solenoid valve 18. The solenoid valve 18 has first and second outlets 18b and 18c. The first outlet 18b is connected through a pipe 20 to a first T-shaped connector 22 and hence through a pipe 24 to one nozzle 26a of a left-hand detergent injector 26 and also through a pipe 28 to one nozzle 30a of a right-hand detergent injector 30. Similarly, the second outlet 18c is connected through a pipe 32 to a second T-shaped connector 34 and hence through a pipe 36 to the other nozzle 26b to the left-hand detergent injector 26 and also through a pipe 38 to the other nozzle 30b of the right-hand detergent injector 30.

The solenoid valve 18 is adapted to shift alternatively between its first position where the inlet 18a is connected to the first outlet 18b and its second position where the inlet 18a is connected to the second outlet 18c. For this purpose, the solenoid valve 18 is associated with a control unit 40 which will be described later in more detail. A relay 42 is provided which includes a relay coil 44 and first and second normally open relay switches 46 and 48. The relay coil 44 has its one terminal connected to ground and the other terminal connected through a system switch 50 and an ignition switch 52 to a battery 54. The first relay switch 46 is connected at its one terminal to ground and at the other terminal to the control unit 40. The second relay switch 48 has its one terminal connected through the ignition switch 52 to the battery 54 and the other terminal connected to the pump 14.

When both of the ignition switch 52 and the system switch 50 are closed, power is supplied from the battery 54 to the relay coil 44 to energize it. This causes the first and second relay switches 46 and 48 to close so that the pump 14 is supplied with power from the battery 54 to introduce liquid detergent from the detergent cistern 10 while at the same time the control unit 40 periodically shifts the solenoid valve 18 between the first and second positions so as to supply liquid detergent from the solenoid valve 18 alternatively to the first and second T-shaped connectors 22 and 34. As a result, liquid detergent is injected from the first nozzles 26a and 30a and the second nozzles 26b and 30b alternatively to the right and left head lamps HL, respectively.

Figure 2:
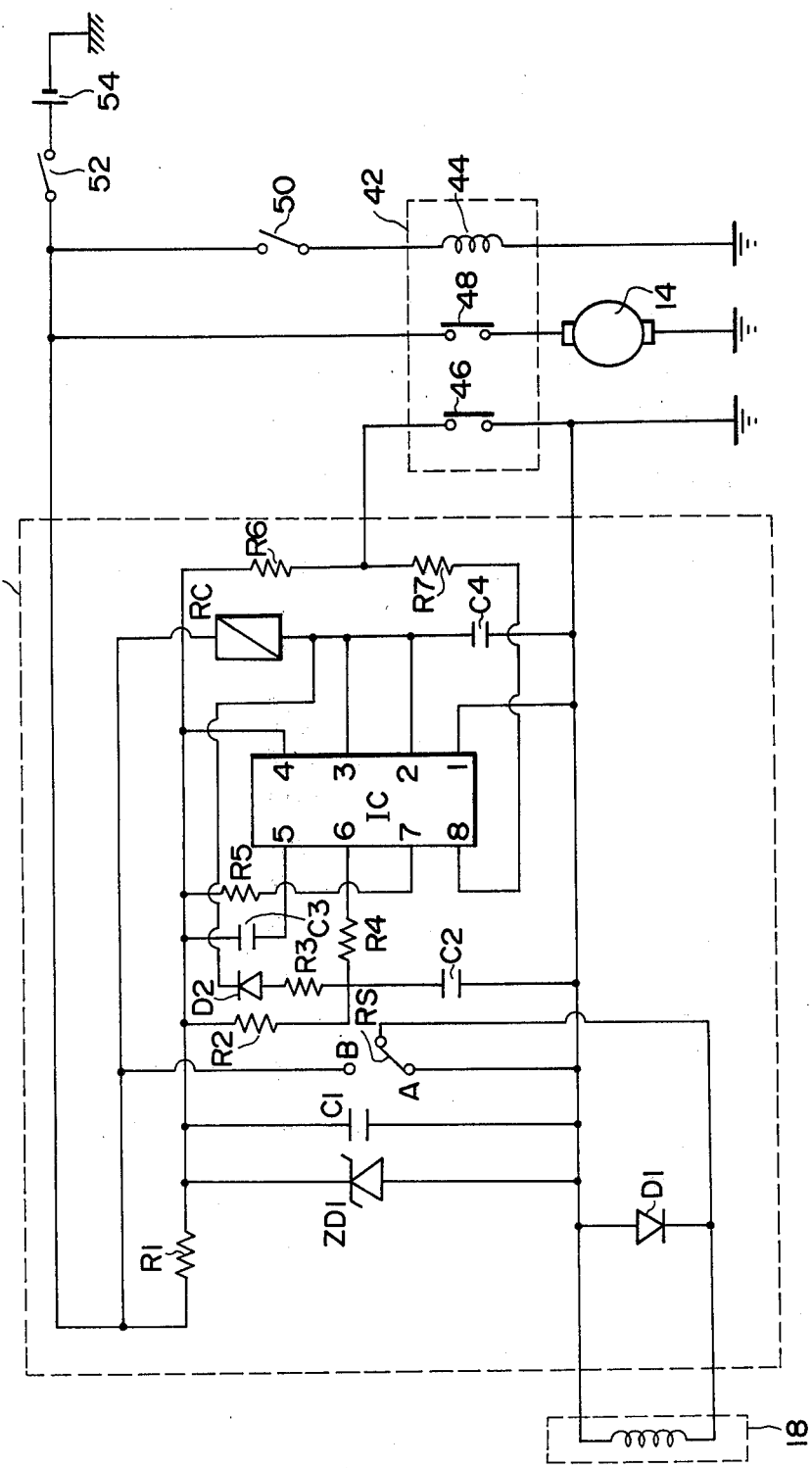
FIG. 2 is a circuit diagram of the control circuit used in the system of FIG. 1.

FIG. 2 is a circuit diagram of the electric circuit included in the head lamp washing system of FIG. 1. The control unit 40 comprises an IC circuit with 1 to 8 terminals, resistors R1 to R7, capacitors C1 to C4, diodes D1 and D2, a Zener diode ZD1, and a relay coil RC operating a relay switch RS having terminals A and B.

When the ignition switch 52 is closed, power is supplied from the battery 54 (for example, a 12 volt battery) through the resistors R1 and R2 to charge the capacitor C2 until the voltage across the capacitor C2 reaches a predetermined level. If the system switch 50 is open and thus the relay switch 46 is open at this time, the terminal 8 is not grounded through the resistor R7 and a connection is made between the terminals 4 and 6 so that power is supplied from the battery 54 through the resistor R1, the terminals 4 and 6, and the resistor R4 to charge the capacitor C2. This permits the capacitor C2 to be charged rapidly after the ignition switch 52 is closed. When the system switch 50 is closed in this state of the electric circuit, the relay coil 44 of the relay 42 is energized to close the relay switches 46 and 48, causing the pump 14 to start to rotate and also the IC circuit to have its terminal 8 connected through the resistor R7 to ground.

When the terminal 8 is grounded, connection is made between the terminals 3 and 1 of the IC circuit to allow electric current to flow through the relay coil RC which is thereby energized. This causes the relay switch RS to close in contact with the terminal B so as to place the solenoid valve 18 in its first position where the inlet 18a is disconnected from the second outlet 18c and instead connected to the first outlet 18b. Simultaneously, the capacitor C2 is discharged through the resistor R3, the diode D2 and the terminals 3 and 1 of the IC circuit.

When the voltage across the capacitor C2 or at the terminal 6 of the IC circuit drops below the predetermined level, the connection between the terminals 3 and 1 of the IC circuit is broken and the relay coil RC is deenergized. This causes the relay switch RS to be changed over into connection with the terminal A so as to place the solenoid valve 18 in its second position where the inlet 18a is disconnected from the first outlet 18b and instead connected to the second outlet 18c. Simultaneously when the connection between the terminals 3 and 1 of the IC circuit is broken, the capacitor C2 starts to be charged through the resistors R1 and R2 so that the solenoid valve 18 is placed in the first position in the same manner as described above. This operation is repeated as long as the system switch 50 is held closed. As a result, the solenoid valve 18 is shifted alternatively between the first and second positions in a predetermined period determined by the period of charge and discharge of the capacitor C2. The period can be properly set by the choice of the values of the capacitor C2 and the resistors R2 and R3.

Figure 3A:
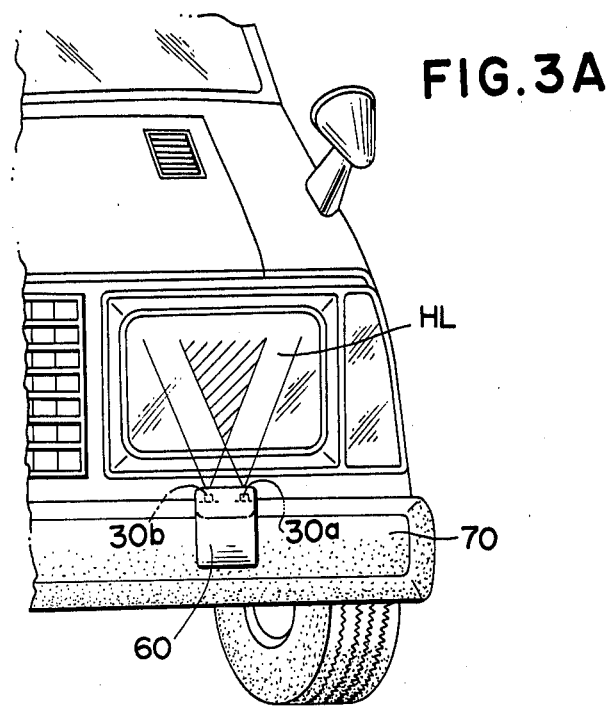
FIGS. 3A and 3B are views showing the position of the detergent injector with respect to the head lamp.
Figure 3B:
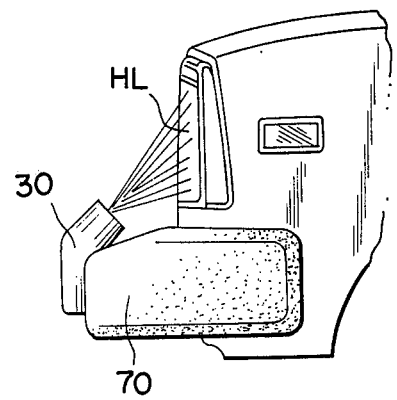

FIGS. 3A and 3B show the position of the first and second nozzles 30a and 30b of the right-hand detergent injector 30 with respect to the right head lamp HL to be washed. The first and second nozzles 30a and 30b are supported by an injector support 60 attached to the bumper 70. As described in connection with FIGS. 1 and 2, the first and second nozzles 30a and 30b are connected to the first and second outlets 18b and 18c, respectively. Thus, the first and second nozzles 30a and 30b alternatively inject liquid detergent in a predetermined period against the head lamp HL to wash its surface. Additionally, the first and second nozzles 26a and 26b of the left-hand injector 26 alternatively inject liquid detergent periodically to wash the surface of the left head lamp HL. That is, four detergent injection nozzles are used to wash the left and right head lamps HL. Since the first and second nozzles 30a and 30b alternatively inject liquid detergent, it is possible to eliminate formation of any detergent overlapping zone as indicated by the hatched area in FIG. 3A.

Figure 4:
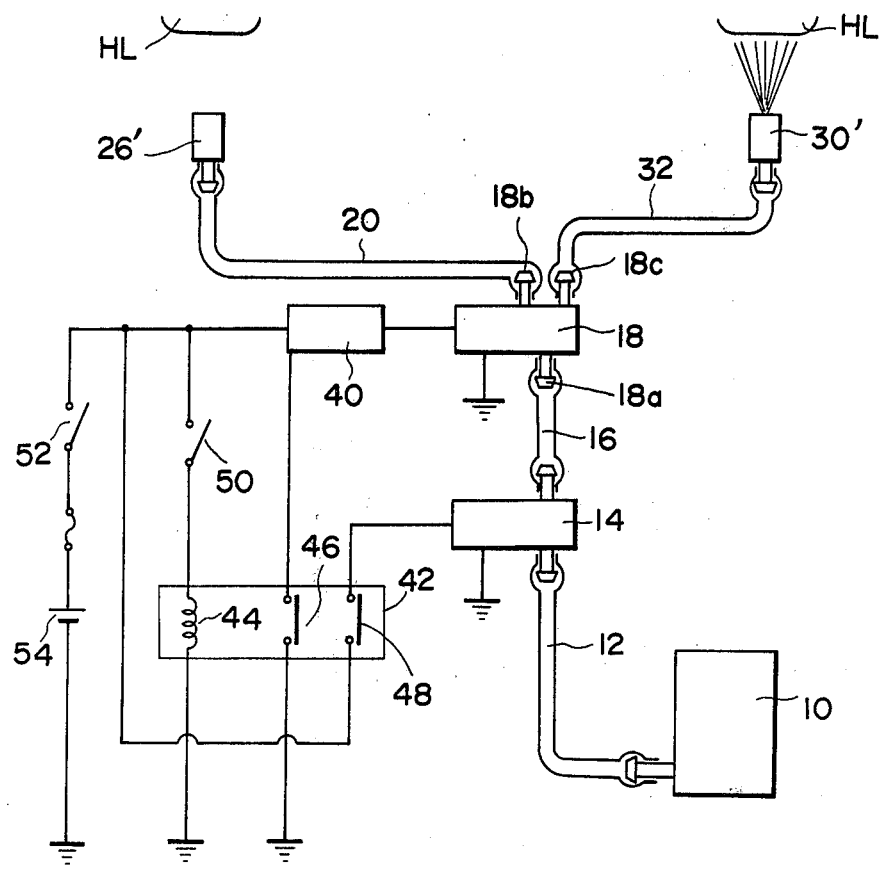
FIG. 4 is a schematic view showing an alternative embodiment of the present invention.

Referring to FIG. 4, there is illustrated a second embodiment of the present invention. This embodiment is substantially similar to the first embodiment except that the first outlet 18b is connected through the pipe 20 is a single injection nozzle 26' and the second outlet 18c is connected through the pipe 32 to a single injection nozzle 30'. That is, the left head lamp HL is washed with liquid detergent injected from the single nozzle 26' and the right head lamp HL is washed with liquid detergent injected from the single nozzle 30'. Since the first and second injection nozzles 26' and 30' injects liquid detergent one at a time, for the same pump output power, the system of FIG. 4 can inject liquid detergent higher in pressure and larger in flow than the system having two injection nozzles injecting liquid detergent at the same time.

As mentioned above, the present invention provides a head lamp washing system including a solenoid valve provided with first and second outlets and means for alternatively opening the first and second outlets. Thus, the system permits the use of an increased number of detergent injection nozzles to provide a wide washing area without the need for any high power pump and without formation of any detergent overlapping zone.

What is claimed is:

1. A head lamp washing system comprising:
  (a) a cistern containing a liquid detergent;
  (b) a pump;
  (c) a solenoid valve having an inlet, and first and second outlets, said solenoid valve inlet connected through said pump to said cistern, said solenoid valve being in a position providing communication between its inlet and its first outlet when energized and in a second position providing communication between its inlet and its second outlet when de-energized;
  (d) a first injector having first and second nozzles connected to said first and second outlets of said solenoid valve, respectively, said first injector disposed near a first head lamp for discharging the liquid detergent against said first head lamp;
  (e) a second injector having first and second nozzles connected to said first and second outlets of said solenoid valve, respectively, said second injector disposed near a second head lamp for discharging the liquid detergent against said second head lamp; and
  (f) a control circuit for periodically changing the position of said solenoid valve, said control circuit adapted to energize said solenoid valve for a predetermined period.

2. A head lamp washing system according to claim 1, wherein said control circuit comprises a capacitor, a relay for allowing a source of power to said solenoid valve to energize same when energized and for cutting-off power to said solenoid valve to de-energize same when de-energized, and means responsive to the voltage across said capacitor for charging said capacitor and cutting-off power to said relay when said voltage is below a predetermined level and for discharging said capacitor and allowing a source of power to said relay when said voltage is above said predetermined level.

3. A head lamp washing system according to claim 1, further comprising means for attaching said first and second injectors on a bumper near said first and second head lamps, respectively.

* * * * *